United States Patent [19]

Cucheran et al.

[11] Patent Number: 5,622,298
[45] Date of Patent: Apr. 22, 1997

[54] ONE-PIECE END SUPPORT AND METHOD OF FORMING THEREOF

[75] Inventors: John S. Cucheran, Lake Orion; Jeffrey M. Aftanas, Sterling Heights, both of Mich.

[73] Assignee: JAC Products, Inc., Ann Arbor, Mich.

[21] Appl. No.: 497,208

[22] Filed: Jun. 30, 1995

[51] Int. Cl.⁶ .................................................... B60R 9/00
[52] U.S. Cl. ............................ 224/326; 224/325; 224/316
[58] Field of Search ................................ 224/326, 327, 224/328, 309, 310, 316, 325, 329

[56] References Cited

U.S. PATENT DOCUMENTS

| 3,724,730 | 4/1973 | Olsen et al. | 224/327 |
| 4,342,411 | 8/1982 | Bott | 224/326 |
| 5,069,377 | 12/1991 | Baughman | 224/326 |
| 5,470,003 | 11/1995 | Cucheran | 224/326 |

*Primary Examiner*—David J. Walczak
*Attorney, Agent, or Firm*—Harness, Dickey & Pierce, PLC

[57] ABSTRACT

A method for forming one-piece end support for a vehicle article carrier.

9 Claims, 3 Drawing Sheets

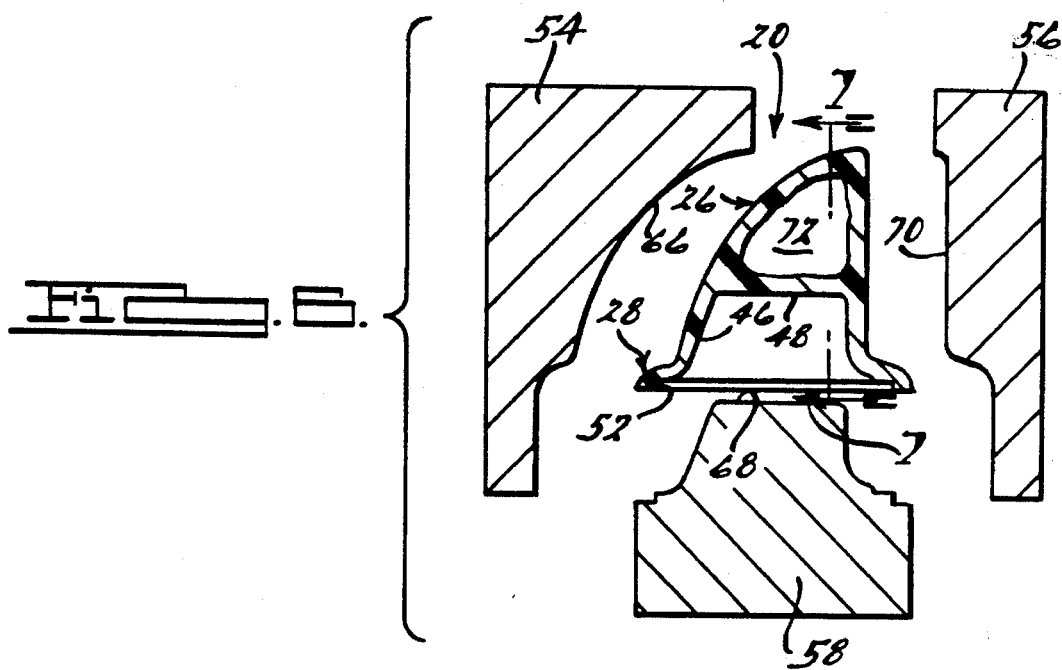
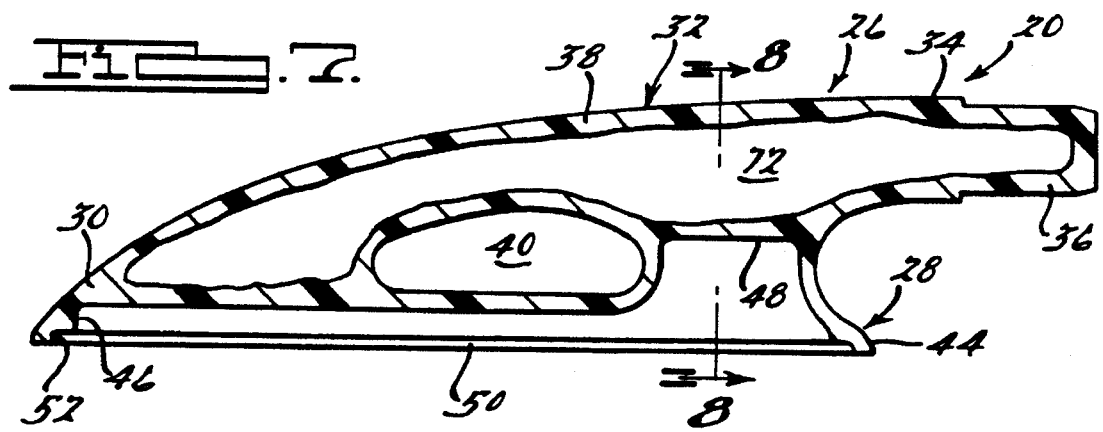
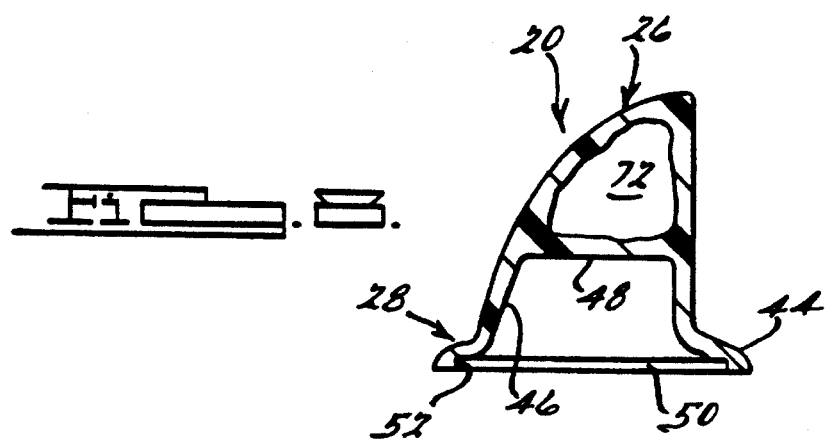

ONE-PIECE END SUPPORT AND METHOD OF FORMING THEREOF

BACKGROUND OF THE INVENTION

1. Technical Field

This invention relates to vehicle article carriers, and more particularly to a one-piece, integrally formed end support for a vehicle article carrier.

2. Discussion

Vehicle article carriers are used in a wide-variety of applications to support luggage securely atop an outer body surface of a vehicle such as a roof or deck lid of the vehicle. Such end supports typically have an aerodynamic design and are secured directly to the outer body surface of a vehicle and include some means for supporting an elongated member such as a side rail above the outer body vehicle surface.

Previously developed end supports having complex aerodynamic designs have involved a two-piece construction. A first piece is formed through well-known molding techniques with apertures or bosses formed therewith adapted to engage or interlock with an independent second piece. The second piece is most typically in the form of a cover which provides the end support with a finished, solid looking appearance. Typically, the cover is secured to the first piece via a plurality of threaded fastening elements or bosses which lockably secure the second piece to the apertures or bosses of the first piece. While some one-piece supports are presently manufacturable, these supports are limited to simple shapes and designs. Such existing, simple design one-piece supports are presently available from the assignee of the present application.

While prior developed end supports have proven generally satisfactory in terms of strength and durability, it would nevertheless be more desirable from a manufacturing standpoint to be able to manufacture an aerodynamic, complexly shaped end support as a one-piece component. This would significantly reduce the manufacturing cost by reducing the tooling necessary to form two independent components. It would also reduce manufacturing costs by eliminating a manufacturing step, that step being the physical securing of the second piece to the first piece to form the finished end support. A one-piece end support would further be desirable from an aesthetic standpoint if same could be manufactured without the appearance of seams or other forms of connecting lines visible when viewing the exterior surfaces of the end support. Finally, a one-piece end support would provide even greater strength and resistance to torsional stresses imparted by a cross bar supported thereon, than most two-piece end supports.

Accordingly, it is a principal object of the present invention to provide a one-piece end support for a vehicle article carrier which is adapted to be readily secured to an outer body vehicle surface, and which is integrally formed as a single-piece component having no visible seams or other molding lines apparent when viewing its exterior surface.

It is still another object of the present invention to provide a method for forming a one-piece end support in which a plurality of molding tools are used in connection with a well-known gas-assisted injection molding process to form an end support having a single-piece construction which does not include any visible molding lines visible from the exterior surface of the end support.

It is still another object of the present invention to provide a one-piece end support and a method of forming same which reduces the overall cost of the end support by reducing the number of manufacturing steps required to manufacture the end support in addition to reducing the molding tooling required to produce the end support.

SUMMARY OF THE INVENTION

The above and other objects are provided by a one-piece end support and method of forming same in accordance with the preferred embodiments of the present invention. The apparatus of the present invention comprises a one-piece end support which includes a main body portion and a bottom portion. The main body portion generally includes an end portion, a central portion and a neck portion. The end portion, central portion and neck portion form a gradually upwardly sloping aerodynamic profile which is aesthetically appealing as well as functionally desirable in minimizing wind, noise and turbulence when the vehicle is travelling at relatively high speeds.

In the preferred embodiment, the bottom portion includes at least one aperture for allowing a conventional fastening element such as a threaded fastener to be positioned therethrough, and fastened to an outer body surface of the vehicle upon which the end support is mounted. The main body portion and bottom portion are integrally formed as a single-piece component and thus do not include any seams or other connecting lines which are visible when the end support is attached to the outer body surface of the vehicle, such as would be the case with prior manufactured two-piece end supports.

The method of the present invention involves using at least a first molding tool and a second molding tool to define a molding cavity into which a molten plastic is injected. The first and second molding tools are urged towards each other to form a molding cavity, and subsequently a predetermined quantity of molten plastic is injected into the molding cavity. A pressurized fluid is then injected into the molding cavity which forces the molten plastic against inner surfaces of each of the first and second molding tools. After a predetermined period of time the fluid pressure is removed from the molding cavity and the first and second molding tools separated, thus revealing the one-piece end support. In a preferred embodiment, a third molding tool is incorporated and moved towards the first and second molding tools, as the first and second molding tools are urged towards each other prior to injecting the molten plastic into the molding cavity.

In one preferred embodiment, the one-piece end support apparatus includes a central opening formed in the central portion, with the bottom portion including a recessed undersurface. In this preferred embodiment, the bottom portion forms a base which protrudes laterally of the central portion. The main body portion also includes a protruding supporting member which is adapted to inter-engage with an elongated support member to support the elongated support member vertically above the outer body vehicle surface. The one-piece end support thus forms an aesthetically appealing component which is less expensive to manufacture than previously manufactured two-piece end supports due to the requirement of less tooling and fewer assembly steps.

BRIEF DESCRIPTION OF THE DRAWINGS

The various advantages of the present invention will become apparent to one skilled in the art by reading the following specification and subjoined claims and by referencing the following drawings in which:

FIG. 6 is an end view of the molding tools shown in FIGS. 3–5 together with a third molding tool, all urged away from the finished one-piece end support;

FIG. 7 is a cross-sectional side view of the finished one-piece end support in accordance with section line 7—7 in FIG. 6; and FIG. 8 is an end cross-sectional view of the one-piece end support of FIG. 7 taken in accordance with section line 8—8 in FIG. 7.

DETAILED DESCRIPTION OF THE PREFERRED EMBODIMENTS

Figure 1:
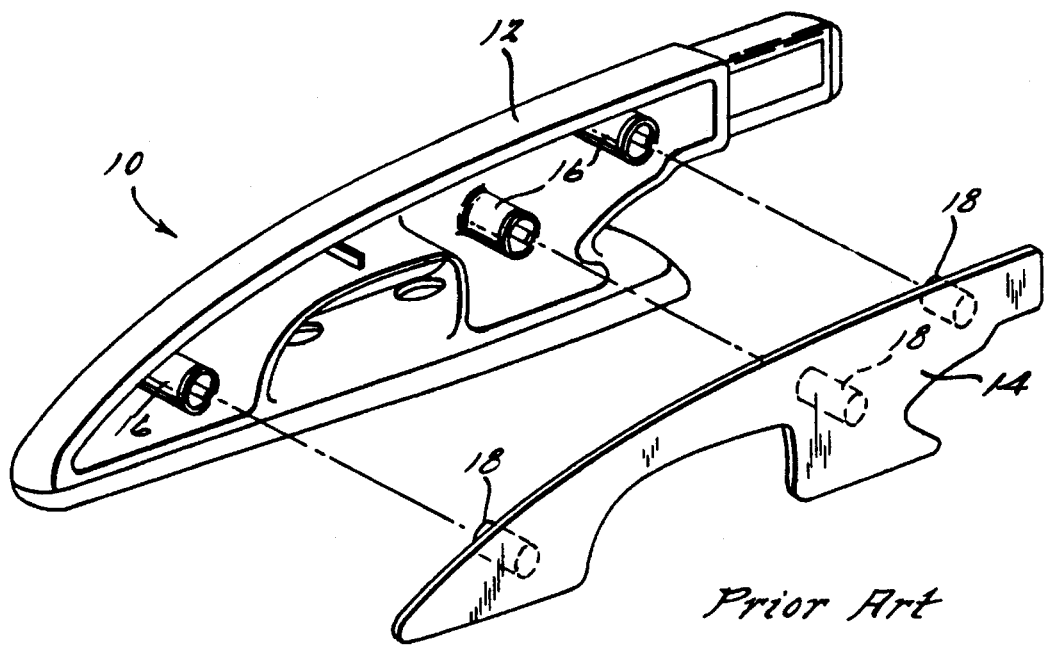
FIG. 1 is a perspective view of a two-piece prior art end support.

Referring to FIG. 1, there is shown a conventional prior art two-piece end support 10. The end support 10 generally includes a first component piece 12 and a second component piece 14. The first component piece 12 typically includes a plurality of integrally formed bosses 16, and the second component piece 14 typically includes a corresponding plurality of studs 18 integrally formed therewith. The second component piece 14 forms a cover which is secured to the first component piece 12 by pressing the second piece 14 against the first piece 12 such that the studs 18 engage within the bosses 16 securely. Conventional adhesives may be placed in the bosses 16 to permanently adhere the studs 18 therein. Alternatively, self-tapping threaded fasteners could be used in lieu of the studs 18 to secure the second piece 14 to the first component piece 12.

While the two-piece end support 10 of FIG. 1 has proven satisfactory for use with vehicle article carriers, the two-piece construction does add additional cost and manufacturing complexity into the process of producing the end support. For one, additional molding tooling is required to separately produce the first component piece 12 and the second component piece 14. An additional assembly step is required to manually secure the second component piece 14 to the first component piece 12. The resulting two-piece end support 10, as a result of its two-piece construction, includes a clearly visible "seam" where the first and second component pieces 12 and 14, respectively, abut. In some instances, it may also be necessary to seal the seam with some form of sealant to prevent water or moisture from entering the interior area of the end support 10.

Figure 2:
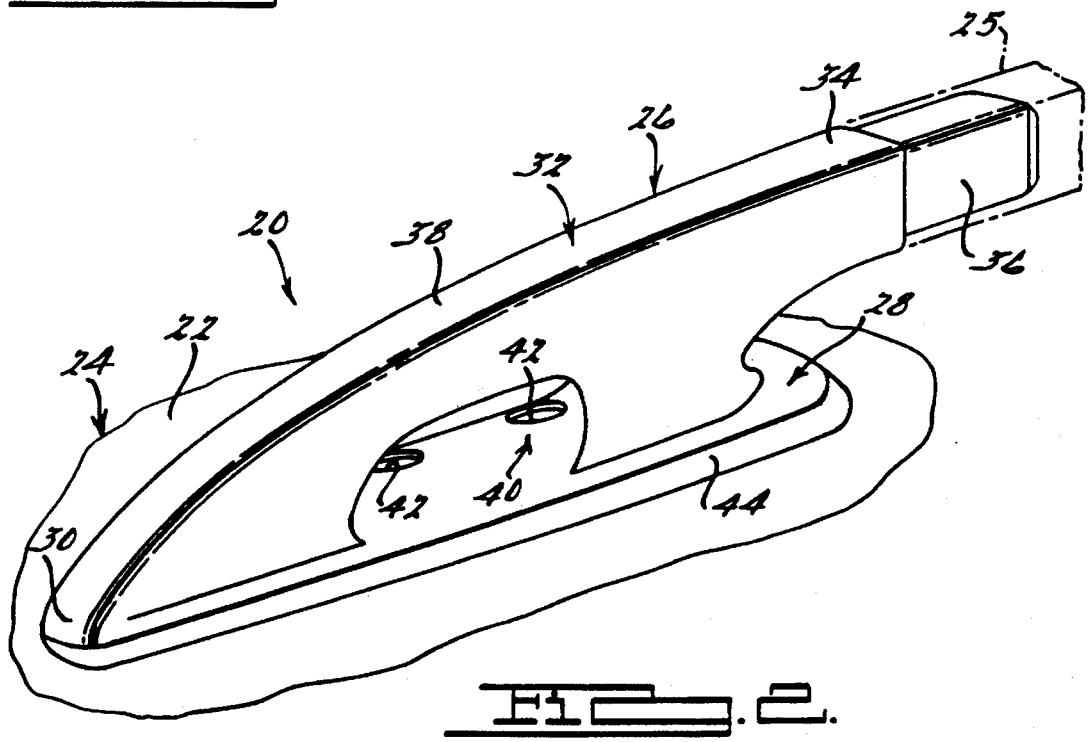
FIG. 2 is a perspective view of a one-piece end support in accordance with the method and apparatus of the present invention.

Referring now to FIG. 2, there is shown a one-piece end support 20 in accordance with a preferred embodiment of the present invention. The end support 20 is adapted to be secured to an outer body surface 22 of a vehicle 24, as will be explained further in the following paragraphs, and to help support an elongated support member 25 (shown in phantom) above the outer body surface 22.

The end support 20 includes a main body portion 26 and a bottom portion 28. The main body portion 26 generally is comprised of an end portion 30, a central portion 32 and a neck portion 34. The neck portion 34 includes a protruding supporting member 36 projecting outwardly therefrom. The end portion 30, central portion 32 and neck portion 34 together form an aerodynamic, gradually upwardly curving upper/outer surface 38, which significantly helps reduce wind noise and adds to the aesthetic appeal of the end support 20.

In the preferred embodiment, the central portion 32 further includes an opening 40 somewhat in the form of an oval. The opening 40 provides even further aesthetic appeal to the end support 20, as well as reducing the amount of material required to construct the end support 20.

With further regard to FIG. 2, the bottom portion 28 has a pair of apertures 42 which allow a conventional threaded fastening element (not shown) to be used to secure the bottom portion 28 to the outer body vehicle surface 22. The bottom portion 28 is preferably constructed so as to flare outwardly slightly of the main body portion 26 to provide additional lateral stability to the end support 20 when the end support is mounted to the outer body vehicle surface 22. In the preferred embodiment, the bottom portion 28 includes a tapered edge 44 which provides an additional degree of aesthetic appeal to the end support 20 and helps the bottom portion 28 blend in more gradually to the outer body vehicle surface 22.

With brief reference to FIGS. 7 and 8, the bottom portion 28 further includes a recessed undersurface 46 formed in part by a lower support wall 48. An optional gasket or other like component 50 may be included and sized to fit within a recessed shoulder portion area 52 integrally formed in the tapered edge portion 44.

Figure 3:
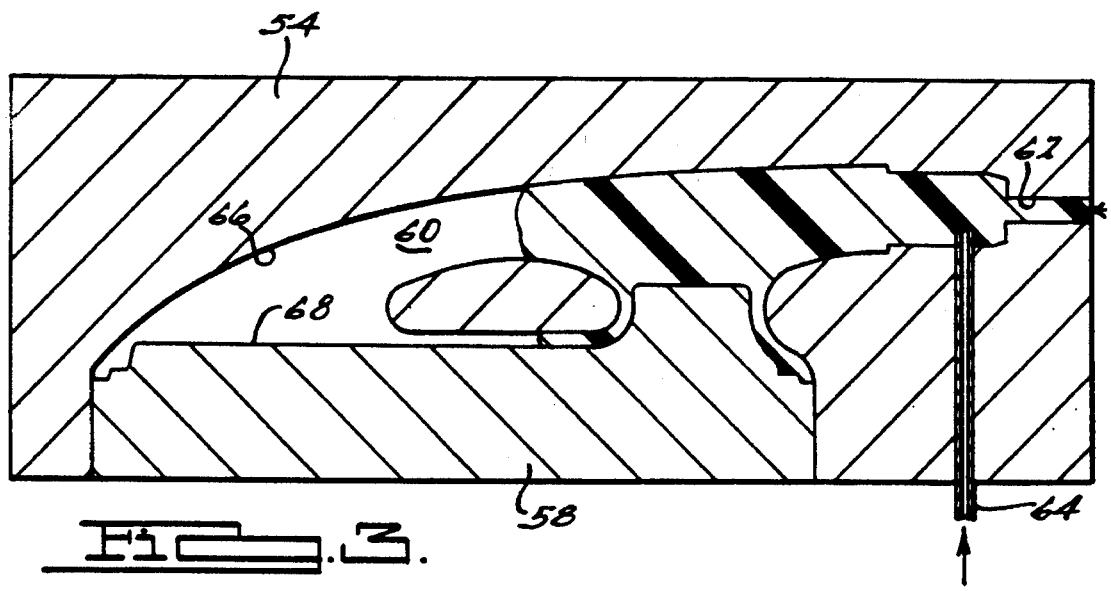
FIG. 3 is a cross-sectional side view of two of the three molding tools used to produce the one-piece end support, and further showing a quantity of molten plastic injected in the molding cavity formed in part by the two molding tools.

Referring now to FIG. 3, the method of forming the end support 20 will be described. With brief reference to FIG. 6, three molding tools 54, 56 and 58 are moved towards each other to form a molding cavity 60 as shown in FIG. 3. From FIG. 3, it will be appreciated, however, that the molding tool 56 is not visible in order to illustrate the molding cavity 60.

With further reference to FIG. 3, once the three molding components 54, 56 and 58 are urged towards each other into abutting contact with each other, a molten thermal plastic such as polyvinylchloride (PVC) is injected through an opening 62 formed by semi-circular openings in surface portions of the molding tools 54 and 56. Once a predetermined quantity of the molten thermal plastic has been injected into the molding cavity 60, a pressurized fluid is injected through a gas-injection tube 64 extending through the molds 54 and 56. The pressurized fluid injected through the gas-injection tube 64 urges the molten thermal plastic outwardly against the inner surface walls 66 and 68 of the molding tools 54 and 58, respectively, and an inner surface 70 (FIG. 6) of the second molding tool 56.

Figure 4:
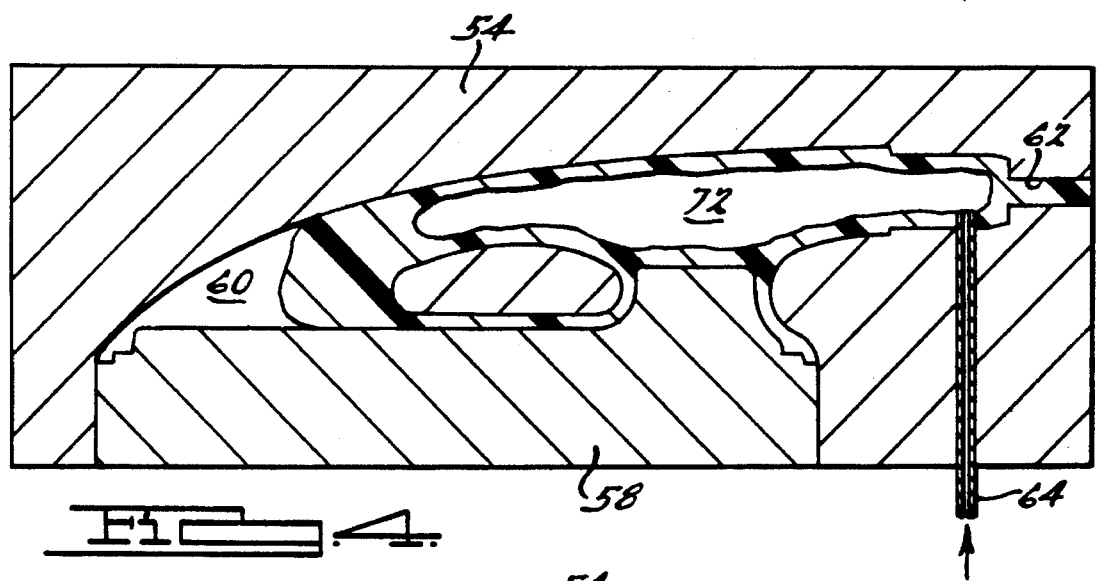
FIG. 4 shows the interior walls of the molding cavity in FIG. 3 being covered by the molten plastic as a gas is injected through one of the molding tools.
Figure 5:
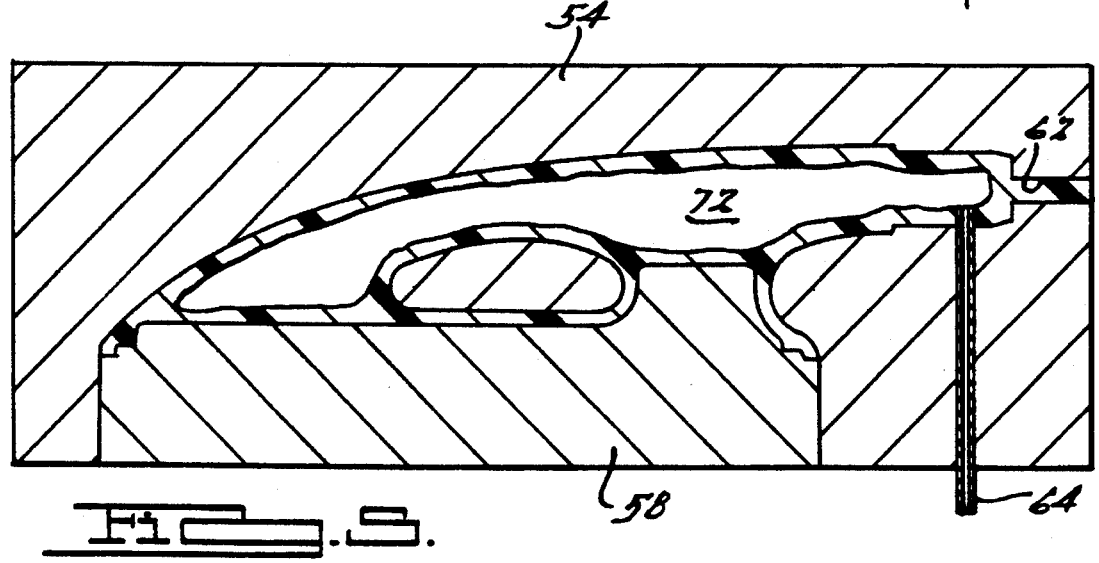
FIG. 5 shows the molding cavity interior walls completely covered by the molten plastic to form the one-piece end support.

From FIGS. 3–5, it can be seen how the pressurized fluid injected through the gas-injection tube 64 urges the quantity of molten thermal plastic throughout the molding cavity 60 so as to form a hollow interior portion 72 shown in FIG. 5. After a predetermined period of time, the fluid pressure is removed and the molten thermal plastic is given a predetermined period of time in which to cool. The three molding tools 54, 56 and 58 are then drawn apart from one another to reveal the finished end support 20, as shown in FIG. 6. The above molding steps may be accomplished with conventional, suitable injection molding equipment.

The molten thermal plastic may be comprised of PVC or a wide-variety of thermal plastics, provided same can be readily injection molded and provide good strength and structural rigidity. The finished end support 20, shown in FIGS. 2, 7 and 8, is relatively light-weight, yet structurally strong. The end support 20, since it is molded as a single-piece component, requires less molding tooling than what otherwise would be required for a two-piece end support, is stronger than a two-piece end support, resists torsional twisting forces better than a two-piece end support and does not require any further assembly steps once the molded part is removed from the mold tooling 54, 56 and 58. This is contrary to conventional two-piece end supports which still require the cover 14 (FIG. 1) to be physically secured to the first component piece 12. It will, therefore, be appreciated that the end support 20 forms an aesthetically appealing end support having no visible seams which would otherwise detract from its aesthetic appeal, and yet is more economical and simple to manufacture than two-piece end supports.

An additional advantage is that a one-piece end support is easier to remove from molding tooling than the two components of a two-piece support. This is because a two-piece support can tend to twist slightly as it is removed from the molding tooling, thus slightly distorting its shape. The one-piece end support of the present invention, having greater structural strength due to its one-piece design, resists such twisting forces as the support is removed from molding tooling.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A method for forming an aerodynamic one-piece end support for a vehicle article carrier securable to an outer body surface of a vehicle and adapted to support an elongated support member vertically above said outer body vehicle surface, said method comprising the steps of:

urging first and second molding tools toward each other;

once said molding tools are positioned in abutting relation, injectin a quantity of molten plastic through at least one, of said tools and injecting a gas through at least one of said tools to urge said molten plastic against an inner surface of each one of said molding tools;

said molding tools having an interior area forming an aerodynamically shaped main body portion, said main body portion including an end portion, a central portion and a neck portion, with said end portion, said central portion and said neck portion forming a gradually aerodynamically curving profile and said central portion including an inaccessible cavity forming a hollowed out potion, a bottom portion integrally formed with said main body portion, said main body portion and said bottom portion forming a single, integrally formed component which may be directly secured to said outer body vehicle surface;

waiting for a length of time after injecting said molten plastic and said gas for said molten plastic to cool; and urging said molding tools away from each other to remove said one-piece end support.

2. The method of claim 1, wherein said bottom portion of said one-piece method apparatus comprises at least one opening for enabling said bottom portion to be secured to said outer body vehicle surface by a fastening element.

3. The method of claim 1, wherein said neck portion includes a protruding supporting member adapted to engage with said support member so as to maintain an end of said support member vertically above said outer body vehicle surface.

4. A method for forming an aerodynamically shaped one-piece method apparatus for use with a vehicle article carrier, said apparatus being securable to an outer body surface of a vehicle and adapted to support at least one end of one support member vertically above said outer body surface without the need for any additional support component, said method comprising the steps of:

urging and second molding tools toward each other until portions of said tools are in abutting engagement;

said tools having interior surfaces forming a main body portion, a bottom portion integrally formed with said main body portion and securable to said outer body vehicle surface, said main body portion including a neck portion having a protruding support member integrally formed therewith, said protruding support member being operable to couple directly to and support an independent support member elevationally above said outer body surface of said vehicle;

injecting a quantity of molten plastic and gas through at least one of said tools;

after a length of time after injecting said molten plastic and said gas, urging said tools away from one another and removing said one-piece end support.

5. The method of claim 4, wherein said bottom portion is formed with a recessed under surface.

6. The method of claim 5, wherein said main body portion is formed to include a central opening extending therethrough.

7. The method of claim 4, wherein a portion of said bottom portion is formed to flare outwardly of said central portion to form a base for securely affixing said apparatus to said outer body vehicle surface.

8. The method of claim 7, wherein said bottom portion is formed to include at least one aperture for enabling a fastening element to secure said bottom portion to said outer body vehicle surface.

9. A method for forming an aerodynamic one-piece end support for a vehicle article carrier securable to an outer body surface of a vehicle and adapted to support one end of an elongated support member elevationally above said outer body vehicle surface, said method comprising the steps of:

urging at least first and second molding tools toward each other into abutting contact, said tools each having interior surfaces defining an aerodynamically shaped main body portion including a hollow cavity formed therein, said main body portion including an integrally formed neck portion, said neck portion including an integrally formed support member adapted to support said one end of said elongated support member without the need for external fastening elements, said hollow cavity being permanently enclosed within said main body portion when said main body portion is manufactured, and a base portion integrally formed with said central portion and adapted to be fixedly secured to said main body portion;

injecting a quantity of molten plastic through an opening in one of said tools;

waiting length of time after injecting said molten plastic, urging said tools away from each other; and removing said one-piece method from said tools.

\* \* \* \* \*

UNITED STATES PATENT AND TRADEMARK OFFICE
CERTIFICATE OF CORRECTION

PATENT NO. : 5,622,298
DATED : April 22, 1997
INVENTOR(S) : John S. Cucheran et al It is certified that error appears in the above-indentified patent and that said Letters Patent is hereby corrected as shown below:

Col. 1, line 11, "wide-variety" should be --wide variety--

Col. 1, line 20, "well-known" should be --well known--

Col. 1, line 61, "well-known" should be --well known--

Col. 2, line 40, after "tools" insert --are--

Col. 4, line 65, "wide-variety" should be --wide variety--

Col. 5, line 41, claim 1, "injectin" should be --injecting--

Col. 6, line 11, claim 4, after "urging" insert --first--

Col. 6, line 29, claim 5, "under surface" should be --undersurface--

Col. 6, line 45, claim 9, "of;" should be --of:--

Col. 6, line 63, claim 9, after "waiting" insert --a--

Col. 6, line 65, claim 9, "method" should be --support--

Signed and Sealed this

Thirtieth Day of September, 1997

Attest:

BRUCE LEHMAN

*Attesting Officer*  *Commissioner of Patents and Trademarks*